US012475731B2

(12) United States Patent
Wang et al.

(10) Patent No.: US 12,475,731 B2
(45) Date of Patent: Nov. 18, 2025

(54) JUVENILE FISH LIMB IDENTIFICATION METHOD BASED ON MULTI-SCALE CASCADED PERCEPTUAL CONVOLUTIONAL NEURAL NETWORK

(71) Applicant: Nanjing Agricultural University, Nanjing (CN)

(72) Inventors: Xiaochan Wang, Nanjing (CN); Yao Wu, Nanjing (CN); Yinyan Shi, Nanjing (CN); Xiaolei Zhang, Nanjing (CN); Naimin Xu, Nanjing (CN); Weimin Li, Nanjing (CN); Dezhi Wang, Nanjing (CN)

(73) Assignee: Nanjing Agricultural University (CN)

( * ) Notice: Subject to any disclaimer, the term of this patent is extended or adjusted under 35 U.S.C. 154(b) by 474 days.

(21) Appl. No.: 18/125,685

(22) Filed: Mar. 23, 2023

(65) Prior Publication Data

US 2023/0343128 A1    Oct. 26, 2023

(30) Foreign Application Priority Data

Apr. 24, 2022  (CN) .......................... 202210454057.3

(51) Int. Cl.
 *G06V 40/10*  (2022.01)
 *G06V 10/26*  (2022.01)
 *G06V 10/30*  (2022.01)
 *G06V 10/82*  (2022.01)

(52) U.S. Cl.
 CPC ............ *G06V 40/10* (2022.01); *G06V 10/273* (2022.01); *G06V 10/30* (2022.01); *G06V 10/82* (2022.01); *G06V 2201/07* (2022.01)

(58) Field of Classification Search
 CPC ...... G06V 40/10; G06V 10/273; G06V 10/30; G06V 10/82; G06V 2201/07; G06V 20/05; G06V 10/764; Y02A 40/81; G06N 3/084
 See application file for complete search history.

(56) References Cited

U.S. PATENT DOCUMENTS

2018/0077909 A1*  3/2018  Endo ........................ A01N 1/12
2021/0056689 A1*  2/2021  Brenner ................. G06V 20/70

* cited by examiner

*Primary Examiner* — Andrew M Moyer
*Assistant Examiner* — Ahmed A Nasher
(74) *Attorney, Agent, or Firm* — Shapiro IP Law; Joseph Shapiro

(57) ABSTRACT

The present disclosure provides a juvenile fish limb identification method based on a multi-scale cascaded perceptual convolutional neural network. The method includes the following steps: acquiring a video sequence of a juvenile fish, dividing a fish body into five non-overlapping parts, performing semantic annotation on the five non-overlapping parts, and taking the five non-overlapping parts as an input of the multi-scale cascaded perceptual convolutional neural network; and using a convolutional layer as a feature extractor, performing feature extraction on an input image containing the annotation of each limb, inputting extracted features into an Attention-region proposal network (RPN) structure, determining a category of each pixel, and generating a limb mask of each limb category using a multi-scale cascade method. According to the method, the limbs of the juvenile fish can be efficiently and accurately identified, and technical support is provided for posture quantification of the juvenile fish.

10 Claims, 3 Drawing Sheets

JUVENILE FISH LIMB IDENTIFICATION METHOD BASED ON MULTI-SCALE CASCADED PERCEPTUAL CONVOLUTIONAL NEURAL NETWORK

CROSS REFERENCE TO RELATED APPLICATION

This patent application claims the benefit and priority of Chinese Patent Application No. 202210454057.3, filed with the China National Intellectual Property Administration on Apr. 24, 2022, the disclosure of which is incorporated by reference herein in its entirety as part of the present application.

TECHNICAL FIELD

The present disclosure belongs to the technical field of deep learning, and in particular, to a juvenile fish limb identification method based on a multi-scale cascaded perceptual convolutional neural network.

BACKGROUND OF THE INVENTION

One of the core issues in aquaculture is quantifying the correlation between the culture environment and the phenotype of fish. In other words, the phenotype of fish shows important information about quality of life. In the process of aquaculture, fish are highly sensitive to the changes of water environment and the stimulation of external environment. Improper culture environment affects the normal development of fish, which is accompanied by a series of phenotypic characterization. Therefore, the method for continuous detecting and quantifying fish phenotypes is a potential measure to assess the living status of fish.

In recent years, although some scholars have developed some fish phenotypic characterization methods, such as the identification of fish contour and plane projection, which meets the needs of aquaculture practitioners to a certain extent. However, these methods focus on phenotype recognition of adult fish and cannot be applied to phenotype identification of juvenile fish. The number of pixels in the limbs of juvenile fish, such as the left and right pectoral fins, is small, and the traditional identification network cannot classify these pixels well. Therefore, it is necessary to design a new limb identification method which is more efficient, more accurate and suitable for juvenile fish.

BRIEF SUMMARY OF THE INVENTION

In view of shortcomings of the prior art, the present disclosure provides a juvenile fish limb identification method based on a multi-scale cascaded perceptual convolutional neural network, which can be effectively applied to phenotype identification of the juvenile fish, with high identification efficiency and excellent accuracy.

The present disclosure achieves the above technical objective through the following technical solutions.

A juvenile fish limb identification method based on a multi-scale cascaded perceptual convolutional neural network includes the following steps:

step 1: acquiring a video sequence of a juvenile fish, obtaining an original image, identifying and separating each individual fish in the original image, deleting incomplete individual fishes, and normalizing a size of the original image;

step 2: dividing a fish body in the original image into multiple non-overlapping parts, performing semantic annotation on each of the multiple non-overlapping parts, and taking the multiple non-overlapping parts as an input of the multi-scale cascaded perceptual convolutional neural network;

step 3: performing image feature extraction, candidate region generation, and fish limb mask generation on an input image using the multi-scale cascaded perceptual convolutional neural network in sequence:

during the image feature extraction, extracting features of the input image through a convolutional layer, a maximum pooling layer and four convolutional structures, and outputting a global feature map;

performing the candidate region generation based on an Attention-region proposal network (RPN), taking a feature map output during the image feature extraction as a shared feature layer of the Attention-RPN and fusing the feature map into a 1,024-dimensional feature map, convolving the input feature map through sliding windows, mapping, by each of the sliding windows, the feature map to a lower dimension for binary classification to determine whether an input feature is a background or a fish body, and regressing frame coordinates; and generating multiple anchor boxes with different sizes and proportions and corresponding annotations with each pixel as a center, where each of the anchor boxes is represented by 256 dimensional features corresponding to a center pixel of the anchor box, and gradient descent and error backpropagation algorithms are adopted during training; and during the fish limb mask generation, processing an output after fusion with all windows using a convolutional kernel of 3*3, fusing with the global feature map to form a region of interest (ROI), up-sampling pixels of the ROI to obtain a more precise representation, processing features of different sizes with a multi-scale input, determining a category of corresponding pixels and regressing pixel coordinates to generate a fish limb mask; and step 4: remapping a target pixel of the fish limb mask generated in step 3 to remove noise, so as to obtain a smooth fish limb mask.

Further, in step 3, a structure layout of the convolutional layer used in the image feature extraction is as follows:

A first layer is the convolutional layer for the image feature extraction, and a convolutional kernel has a size of 7*7, a stride of 2, and a number of channels of 64. A second layer is the maximum pooling layer for dimension reduction, and the pooling layer has a size of 3*3 and a stride of 2.

Third to eleventh layers are a convolutional structure conv2_X, including 3 groups of convolutional structures with a convolutional kernel having a size of 1*1 and a number of channels of 64, a convolutional kernel having a size of 3*3 and a number of channels of 64, and a convolutional kernel having a size of 1*1 and a number of channels of 256. Twelfth to twenty-third layers are a convolutional structure conv3_X, including 4 groups of convolutional structures with a convolutional kernel having a size of 1*1 and a number of channels of 128, a convolutional kernel having a size of 3*3 and a number of channels of 128, and a convolutional kernel having a size of 1*1 and a number of channels of 512. Twenty-fourth to ninety-fourth layers are a convolutional structure conv4_X, including 23 groups of convolutional structures with a convolutional kernel having a size of 1*1 and a number of channels of 256, a convolutional kernel having a size of 3*3 and a number of channels of 256, and a convolutional kernel having a size of 1*1 and a number of channels of 1,024. Ninety-third to one hundred and first layers are a convolutional structure conv5_X, including 3 groups of convolutional structures with a convolutional kernel having a size of 1*1 and a number of channels of 512, a convolutional kernel having a size of 3*3 and a number of channels of 512, and a convolutional kernel having a size of 1*1 and a number of channels of 2,048.

Further, in step 3, a specific process of the candidate region generation based on the Attention-RPN is as follows:

initializing a connection weight, a threshold and a learning rate, setting an activation function, calculating an output of a hidden layer and an output of the network, calculating a network error, and calculating a partial derivative of the network error to a connection weight of an output layer and a connection weight of the hidden layer; updating network parameters; calculating a global error of the network, determining whether the global error of the network meets a set required value, if yes, determining network convergence, and if not, returning for a next iteration; calculating an intersection over union (IOU) through a true value manually marked in step 2, selecting positive and negative sample sets for training, retaining pixels with an IOU>0.7, and discarding pixels with an IOU<0.3; and calculating similarity between an eigenvalue generated by the Attention-RPN and a label by a depth-by-depth method, and selectively retaining anchor boxes with high similarity to generate candidate regions through the similarity.

Further, a formula for calculating the output $H_j$ of the hidden layer is:

$$H_j = f\left(\sum_i^n \omega_{ij} x_i - a_i\right), j = 1, \ldots, l,$$

where $\omega_{ij}$ is the connection weight of the hidden layer, $x_i$ is a i-th input of the Attention-RPN, i=1, . . . , n, $a_i$ is a threshold of the hidden layer, $H_j$ is an output of a j-th hidden layer, and l is a total number of the hidden layers.

A formula for calculating an output $y_k$ of the Attention-RPN is:

$$y_k = \sum_{j=1}^{l} H_j \omega_{jk} - b_k, k = 1, \ldots, m,$$

where $\omega_{jk}$ is the connection weight of the output layer, $b_k$ is a threshold of the output layer, k is a serial number of the output layer, and m is a total number of the output layers.

The network error is: $e_k = y_k - d_k$, where $e_k$ is the network error and $d_k$ is a k-th expected output.

Further, formulas for updating the network parameters are:

$$\omega_{jk}^{n+1} = \omega_{jk}^n - \eta \frac{\partial e}{\omega_{jk}} \text{ and } \omega_{ij}^{n+1} = \omega_{ij}^n - \eta \frac{\partial e}{\omega_{ij}},$$

respectively, where $\eta$ is a momentum factor, both $$\frac{\partial e}{\omega_{jk}} \text{ and } \frac{\partial e}{\omega_{ij}}$$

represent a partial derivative of the network error to the weight, $\omega_{jk}^n$ is a connection weight of an n-th output layer, $\omega_{jk}^{n+1}$ is a connection weight of an updated (n+1)-th output layer, $\omega_{ij}^n$ is a weight of an n-th hidden layer, and $\omega_{ij}^{n+1}$ is a connection weight of an updated (n+1)-th hidden layer.

Further, a formula for calculating the global error of the network E is:

$$E = \frac{1}{m} \sum_{k=1}^{m} (d_k - y_k)^2,$$

where k is a serial number of the output layer, m is a total number of the output layers, $d_k$ is a k-th expected output, and $y_k$ is an output of the Attention-RPN.

A loss function is:

$$L(\{p_{arc}\}, \{t_{arc}\}) = \frac{1}{N_{cls}} \sum_i L_{cls}(p_{arc}, p_{arc}^*) + \lambda \frac{1}{N_{reg}} \sum_{arc} p_{arc}^* L_{reg}(t_{arc}, t_{arc}^*),$$

where $N_{cls}$ represents a number of categories; $L_{cls}$ represents logarithmic loss of binary classification; arc represents all anchor boxes for each batch; $P_{arc}$ represents a probability that the anchor box belongs to a positive anchor box, when the anchor box is the positive anchor box, $p^*_{arc}$ is 1, otherwise, $p^*_{arc}$ is 0; $N_{reg}$ represents a number of regressions of anchor boxes; $\lambda$ represents a penalty coefficient of a regression function for weight distribution in calculation of regression loss and classification loss during network training; $L_{reg}$ represents regression loss of the anchor box; $t_{arc}$ represents parameterized coordinates of a predictive box; $t^*_{arc}$ represents parameterized coordinates of a target box; and outputs of a classification layer and a regression layer are respectively $\{P_{arc}\}$ and $\{t_{arc}\}$ normalized by $N_{cls}$, $N_{reg}$ and $\lambda$.

Further, the parameterized coordinates are fine-tuned by regression through the following formulas:

$$t_x = (x - x_a)/w_a, t^*_x = (x^* - x_a)/w_a,$$

$$t_y = (y - y_a)/h_a, t^*_y = (y^* - y_a)/h_a,$$

$$t_w = \log(w/w_a), t^*_w = \log(w^*/w_a), \text{ and}$$

$$t_h = \log(h/h_a), t^*_h = \log(h^*/h_a),$$

where x and y represent central coordinates of the predictive box; w and h represent a width and height of the predictive box respectively; $x_a$ and $y_a$ represent central coordinates of the generated anchor box; $w_a$ and $h_a$ represent a width and height of the generated anchor box respectively; x* and y* represent central coordinates of the target box; and w* and h* represent a width and height of the target box respectively.

$t_{arc} = [t_x, t_y, t_w, t_h]$ and $t^*_{arc} = [t_x, t_y, t_w, t_h]$.

Further, the similarity is defined as:

$$G_{h,w,c} = \sum_{i,j} X_{i,j,c} Y_{h+i-1, w+j-1, c}, i, j \in \{1, \ldots, S\},$$

where $G_{h,w,c}$ represents a feature map having a window size of h*W and a number of channels of c generated by the Attention-RPN; $X_{i,j,c}$ represents features of a label image in the window calculated by the depth-by-depth method; $Y_{h+i-1, w+j-1, c}$ represents a feature map of the label image; S represents a maximum value selected by the sliding window; and j represents a serial number of the hidden layer, and i represents an input of the Attention-RPN.

Further, in step 3, a specific process of the fish limb mask generation is as follows:

extracting features of images of small-size limbs by general convolution, and extracting features of images of large-size limbs by dilated convolution, where dilated convolution is $g_r=ROI*_r count$, $*_r$ represents a dilated convolution operation, r represents an expansion coefficient, in the general convolution, r=1, in the dilated convolution, r=n, n>1, and count represents a number of dilated convolution executions; defining an iterative function on a set X as: assuming X to be a set and $f^p$: X→X to be a function, where f represents a mapping operation of X, a superscript represents a specific number of iterations, $f^0$=idx, $f^{p+1}$=f∘$f^p$, p is a non-negative integer, idx is an identity function on X, f∘$f^p$ represents a compound operation of the two functions, a compound result is represented by f(g(x)), and a final multi-scale enhancement output result is $$\text{multi\_F} = \prod_{q=1}^{4} g_{r=1} \circ g_{r=2}^{q-1},$$

where q represents a q-th branch, that is, the number of dilated convolution executions, $g_{r=2}^{q-1}$ represents dilated convolution with an expansion coefficient of 2, and $g_{r=1}$ represents general convolution with an expansion coefficient of 1; and inputting the multi-scale enhancement output result multi_F into a fully connected layer, outputting classification results of pixels in each ROI using a softmax activation function, and drawing the limb mask using a same color for pixels of a same category.

Further, a specific process of step 4 is as follows: inputting classification label information of the fish limb mask generated in step 3, obtaining bounding boxes of each mask, traversing image pixels, adding a classification label for each pixel, calculating a number of pixels in each connected area, and retaining a unique maximum connected area of a same category.

The present disclosure has the following beneficial effects.

The present disclosure combines machine vision and deep learning technology to realize automatic acquisition, identification and classification of the limb phenotype of the fish in aquaculture, which can reduce the stress response of the fish and reduce the physical damage to the fish through non-contact acquisition method. The present disclosure realizes the identification of juvenile fish limbs by constructing an improved deep neural network. Compared with the traditional biological character identification method, the present disclosure has higher precision and generalization ability and higher identification speed and efficiency, and can fully meet the production needs. The Attention-RPN structure constructed by the present disclosure can realize efficient ROI spatial search, have more effective perception ability for small-scale limb features, and improve the classification accuracy of small-scale limb pixels. The multi-scale cascade fish limb mask generation structure constructed by the present disclosure can fuse high and low level image information to generate a mask coding with a spatial resolution of twice, restore the full resolution of the patch, and finally output a fine-grained object mask. The target pixel remapping constructed by the present disclosure can effectively remove noise containing feature pixels, including multi-fish interference and light spot interference, and the limb mask generated has smooth and neat edges.

DETAILED DESCRIPTION OF THE INVENTION

| Table of Reference Numbers from Drawings: | |
|---|---|
| Reference Number | Description |
| 100 | flowchart of juvenile fish limb identification method |
| 110 | step in flowchart 100 |
| 120 | step in flowchart 100 |
| 130 | step in flowchart 100 |
| 140 | step in flowchart 100 |
| 150 | step in flowchart 100 |
| 160 | step in flowchart 100 |
| 200 | schematic diagram of identifying and separating individual fish in an image |
| 201 | original image |
| 210a-n | identified complete fish image |
| 211a-n | incomplete identified fish image |
| 300 | architecture diagram of a multi-scale cascaded perceptual convolutional neural network |
| 310 | image feature extraction |
| 311 | convolution layer |
| 312 | pooling layer |
| 313a-d | convolutional structures |
| 314 | global feature map |
| 320 | candidate region generation |
| 321 | label image from conv4_X |
| 322 | label image |
| 323 | deep convolution algorithm |
| 324 | Depth-by-depth algorithm |
| 325 | G feature windows |
| 326 | output after fusion with all G feature windows |
| 330 | limb mask generator |
| 340 | limb mask |

The following table is for convenience only, and should not be construed to supersede any potentially inconsistent disclosure herein.

The present disclosure will be further described below in conjunction with the accompanying drawings and specific embodiments, but the protection scope of the present disclosure is not limited thereto.

Figure 1:
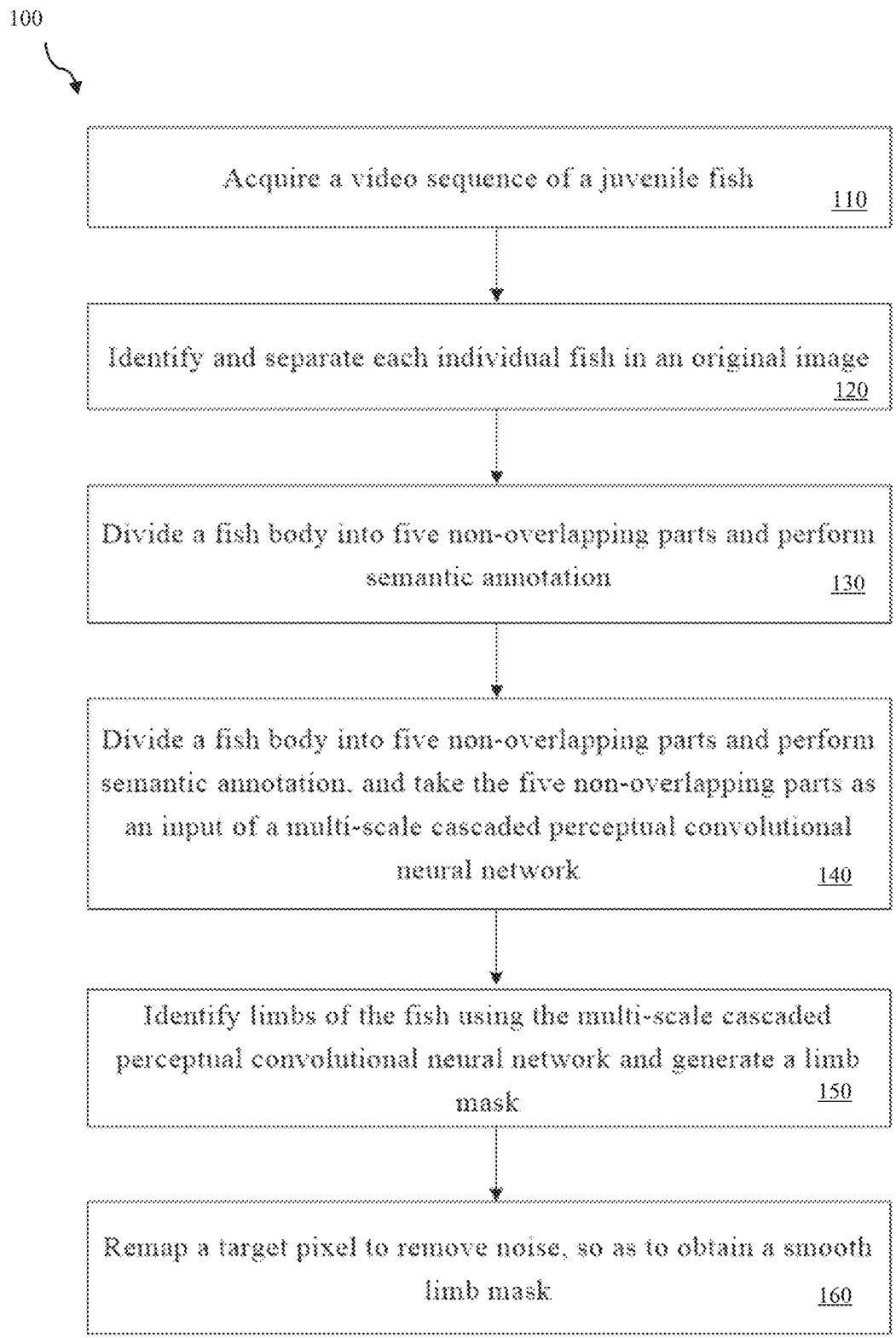
FIG. 1 is a flowchart of a juvenile fish limb identification method according to the present disclosure.

The present disclosure preferably takes the yellow catfish as a research object for solution description. A juvenile fish limb identification method based on a multi-scale cascaded perceptual convolutional neural network of the present disclosure is shown in FIG. 1, and a specific process is as follows.

Step 1 (reference no. 110): A video sequence of a juvenile yellow catfish is acquired.

Figure 2:
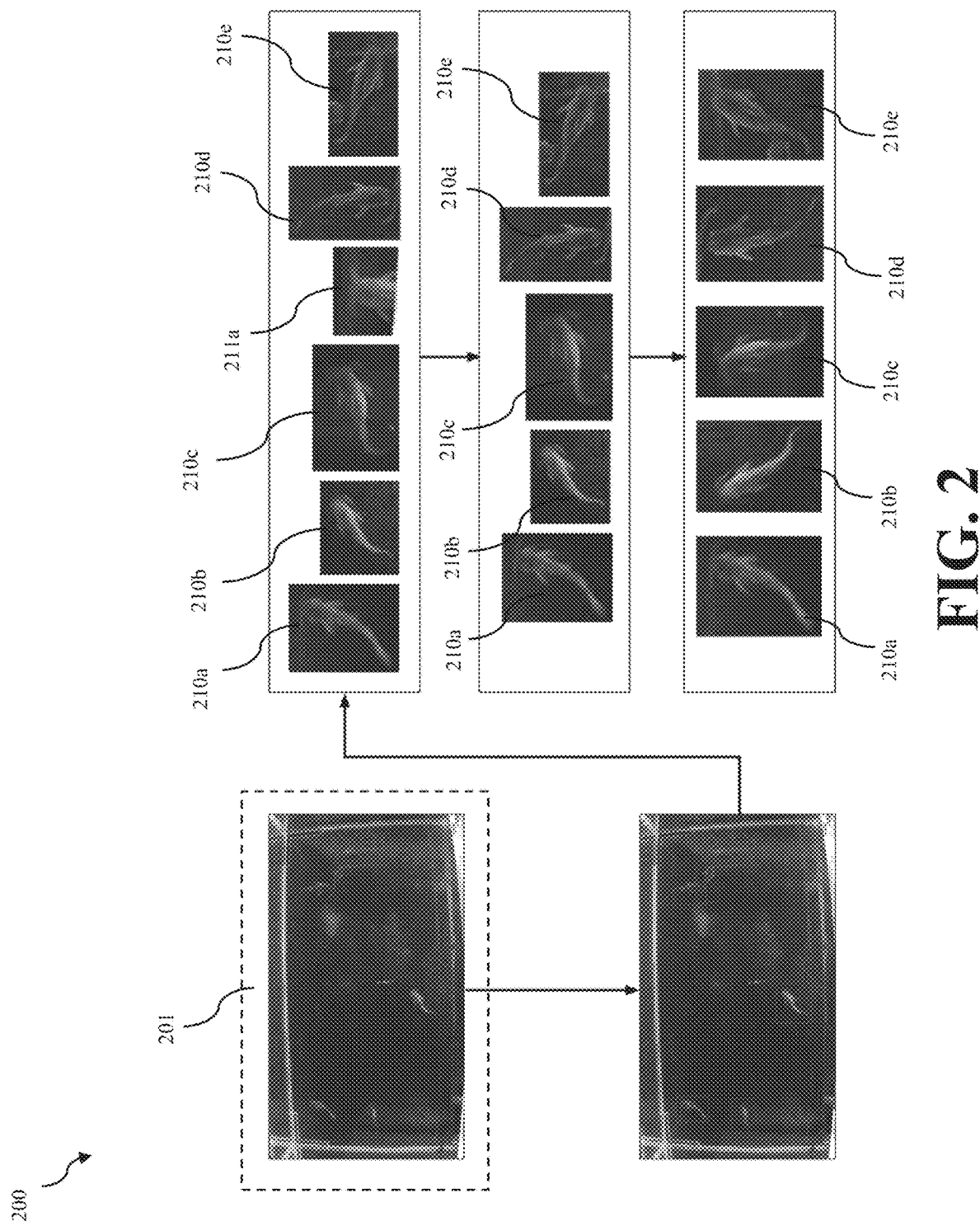
FIG. 2 is a schematic diagram of identifying and separating each individual fish in an original image.

Step 2 (reference no. 120): As shown in FIG. 2, each individual fish 210a-n in the original image 201 is identified and is separated from the original image 201, incomplete individual fishes 211a-n are deleted from the separated image, and a size of the image is normalized.

Step 3 (reference no. 130): In view of the images of the individual fishes obtained in step 2 (reference no. 120), according to the morphological structure of the visible part of the fish body, the fish body is divided into five non-overlapping parts: head, trunk, tail, left pectoral fin and right pectoral fin, which are subjected to semantic annotation. The annotated images are used as the input of multi-scale cascaded perceptual convolutional neural network after passing the secondary audit.

Figure 3:
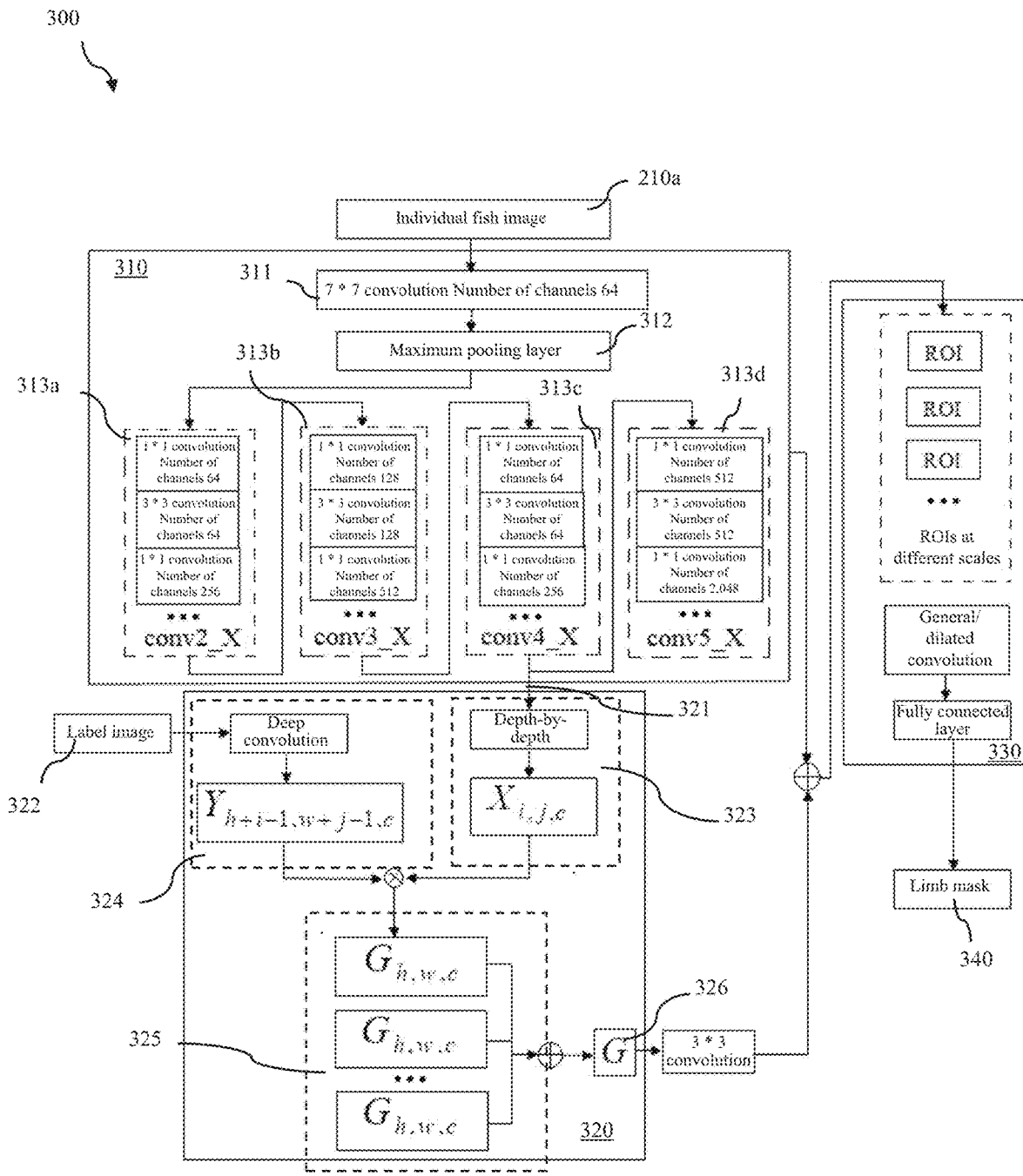
FIG. 3 is an architecture diagram of a multi-scale cascaded perceptual convolutional neural network of the present disclosure.

Step 4 (reference no. 140): As shown in FIG. 3, the multi-scale cascaded perceptual convolutional neural network 300 is used to identify the limbs of the fish and generate the limb mask 350. The processing of the input image by the multi-scale cascaded perceptual convolutional neural network includes three parts, namely: image feature extraction, candidate region generation, and fish limb mask generation. A specific process is as follows.

Step 4.1: Image feature extraction 310: features of the input image 210a are extracted through a convolutional layer 311, a maximum pooling layer 312 and four convolutional structures 313a-d, and a global feature map is output. A specific layout is as follows.

A first layer is the convolutional layer for the image feature extraction 310, and a convolutional 311 kernel has a size of 7*7, a stride of 2, and a number of channels of 64. A second layer is the maximum pooling layer 312 for dimension reduction, and the pooling layer has a size of 3*3 and a stride of 2.

Third to eleventh layers are a convolutional structure conv2_X, including 3 groups of convolutional structures with a convolutional kernel having a size of 1*1 and a number of channels of 64, a convolutional kernel having a size of 3*3 and a number of channels of 64, and a convolutional kernel having a size of 1*1 and a number of channels of 256. Twelfth to twenty-third layers are a convolutional structure conv3_X, including 4 groups of convolutional structures with a convolutional kernel having a size of 1*1 and a number of channels of 128, a convolutional kernel having a size of 3*3 and a number of channels of 128, and a convolutional kernel having a size of 1*1 and a number of channels of 512. Twenty-fourth to ninety-fourth layers are a convolutional structure conv4_X, including 23 groups of convolutional structures with a convolutional kernel having a size of 1*1 and a number of channels of 256, a convolutional kernel having a size of 3*3 and a number of channels of 256, and a convolutional kernel having a size of 1*1 and a number of channels of 1,024. Ninety-third to one hundred and first layers are a convolutional structure conv5_X, including 3 groups of convolutional structures with a convolutional kernel having a size of 1*1 and a number of channels of 512, a convolutional kernel having a size of 3*3 and a number of channels of 512, and a convolutional kernel having a size of 1*1 and a number of channels of 2,048.

Step 4.2: Candidate region generation 320: the traditional RPN is improved and an attention mechanism is added to form an Attention-RPN. A feature map 321 output from Conv4_X is used as a shared feature layer of the attention-RPN structure and fused into a 1,024-dimensional feature map. The input feature map is convolved through sliding windows. Each of the sliding windows maps the feature map to a lower dimension for binary classification to determine whether an input feature is a background or a fish body, and frame coordinates are regressed. Multiple anchor boxes with different sizes and proportions and corresponding annotations are generated with each pixel as a center. Each of the anchor boxes is represented by 256 dimensional features corresponding to a center pixel of the anchor box, and gradient descent and error backpropagation algorithms are adopted during training. A specific layout is as follows:

A connection weight, a threshold and a learning rate are initialized, and an activation $$f(x) = \frac{1}{1+e^{-x}}.$$

function is set as:
An output $$H_j = f\left(\sum_{i}^{n} \omega_{ij} x_i - a_i\right), j = 1, \ldots, l$$

of a hidden layer is calculated, where $\omega_{ij}$ is a connection weight of the hidden layer, $x_i$ is a i-th input of the Attention-RPN, i=1, ..., n, $a_i$ is a threshold of the hidden layer, $H_j$ is an output of a j-th hidden layer, and l is a total number of the hidden layers.

An output $$y_k = \sum_{j=1}^{l} H_j \omega_{jk} - b_k, k = 1, \ldots, m$$

of the Attention-RPN is calculated, where $\omega_{jk}$ is the connection weight of the output layer, $b_k$ is a threshold of the output layer, $y_k$ is an output of a k-th output layer, and m is a total number of the output layers.

The network error $e_k$ is calculated: $e_k = y_k - d_k$, where $d_k$ is a k-th expected output.

A partial derivative of the network error to $\omega_{jk}$ and $\omega_{ij}$ is calculated. The error function is an open-up function with a minimum value. Using the error function to take the derivative of the parameter is to find the parameter at the lowest moment of the error function, such that the parameter can map the input data to a number with the smallest error from the actual number.

The network parameters are updated, and the updating formulas are:

$$\omega_{jk}^{n+1} = \omega_{jk}^n - \eta \frac{\partial e}{\partial \omega_{jk}} \text{ and } \omega_{ij}^{n+1} = \omega_{ij}^n - \eta \frac{\partial e}{\partial \omega_{ij}}$$

respectively, where η is a momentum factor and is set as 0.001, both $$\frac{\partial e}{\partial \omega_{jk}} \text{ and } \frac{\partial e}{\partial \omega_{ij}}$$

represent a partial derivative of the network error to the weight and can be solved by the chain rule, $\omega_{jk}^n$ is a connection weight of an n-th output layer, $\omega_{jk}^{n+1}$ is a connection weight of an updated (n+1)-th output layer, $\omega_{ij}^n$ is a weight of an n-th hidden layer, and $\omega_{ij}^{n+1}$ is a connection weight of an updated (n+1)-th hidden layer.

A global error of the network is calculated: E:

$$E = \frac{1}{m}\sum_{k=1}^{m}(d_k - y_k)^2.$$

Whether the global error of the network meets a set required value is determined, if yes, network convergence is determined, and if not, the method returns for a next iteration. A loss function is defined as:

$$L(\{P_{arc}\}, \{t_{arc}\}) = \frac{1}{N_{cls}}\sum_i L_{cls}(P_{arc}, p^*_{arc}) + \lambda \frac{1}{N_{reg}}\sum_{arc} p^*_{arc} L_{reg}(t_{arc}, t^*_{arc}),$$

where $N_{cls}$ represents a number of categories, $L_{cls}$ represents logarithmic loss of binary classification, arc represents all anchor boxes for each batch, $P_{arc}$ represents a probability that the anchor box belongs to a positive anchor box, when the anchor box is the positive anchor box, $p^*_{arc}$ is 1, otherwise, $p^*_{arc}$ is 0, $N_{reg}$ represents a number of regressions of anchor boxes, $\lambda$ represents a penalty coefficient of a regression function for weight distribution in calculation of regression loss and classification loss during network training, $L_{reg}$ represents regression loss of the anchor box, $t_{arc}$ represents parameterized coordinates of a predictive box, $t^*_{arc}$ represents parameterized coordinates of a target box, and outputs of a classification layer and a regression layer are respectively $\{P_{arc}\}$ and $\{t_{arc}\}$ normalized by $N_{cls}$, $N_{reg}$ and $\lambda$.

After the parameterized coordinates are obtained, a predictive box is fine-tuned by regression through the following formulas to make it closer to the real coordinate box:

$t_x=(x-x_a)/w_a, t^*_x=(x^*-x_a)/w_a$, $t_y=(y-y_a)/h_a, t^*_y=(y^*-y_a)/h_a$, $t_w=\log(w/w_a), t^*_w=\log(w^*/w_a)$, and $t_h=\log(h/h_a), t^*_h=\log(h^*/h_a)$, where x and y represent central coordinates of the predictive box, w and h represent a width and height of the predictive box respectively, $x_a$ and $y_a$ represent central coordinates of the generated anchor box, $w_a$ and $h_a$ represent a width and height of the generated anchor box respectively, x* and y* represent central coordinates of the target box, and w* and h* represent a width and height of the target box respectively.

$t_{arc}=[t_x,t_y,t_w,t_h]$ is a set of vectors representing the parameterized coordinates of the predicted coordinate box.

$t^*_{arc}[t_x,t_y,t_w,t_h]$ is the parameterized coordinates of the real regression box corresponding to the positive class.

An IOU is calculated through a true value manually marked in step 3, positive and negative sample sets are selected for training, pixels with an IOU>0.7 are retained, and pixels with an IOU<0.3 are discarded.

Similarity between an eigenvalue generated by the Attention-RPN and a label is calculated by a depth-by-depth method, and anchor boxes with high similarity are selectively retained to generate candidate regions through the similarity. The similarity is defined as:

$$G_{h,w,c} = \sum_{i,j} X_{i,j,c} Y_{h+i-1,w+j-1,c}, i, j \in \{1, \ldots, S\},$$

where $G_{h,w,c}$ 325 represents a feature map having a window size of h*w and a number of channels of c generated by the Attention-RPN, $X_{i,j,c}$ represents features of a label image 323 in the window calculated by the depth-by-depth method (averaging), $Y_{h+i-1,w+j-1,c}$ represents a feature map of the label image 324, and S represents a maximum value selected by the sliding window.

Step 4.3: Fish limb mask generation 330:

In the present embodiment, G 326 is used to represent an output after fusion with all windows (that is, an output after fusion with all $G_{h,w,c}$). G 326 is processed by a 3*3 convolutional kernel and fused with the global feature map to form an ROI. Pixels of the ROI are up-sampled to obtain a more precise representation, features of different sizes are processed with a multi-scale input, a category of corresponding pixels is determined and pixel coordinates are regressed to generate a fish limb mask.

General convolution is used for extracting features of images of small-size limbs, and dilated convolution is used for extracting features of images of large-size limbs. Dilated convolution is $g_r=ROI*_r count$, where $*_r$ represents a dilated convolution operation, r represents an expansion coefficient, in the general convolution, r=1, in the dilated convolution, r=n, n>1, and count represents a number of dilated convolution executions. An iterative function on a set X is defined as: assuming X to be a set and $f^p$: X→X to be a function, where f represents a mapping operation of X, a superscript represents a specific number of iterations, $f^0$=idx, $f^{p+1}$=f∘$f^p$, p is a non-negative integer, idx is an identity function on X, f∘$f^p$ represents a compound operation of the two functions, a compound result is represented by f(g(x)), and a final multi-scale enhancement output result is $$\text{multi\_F} = \prod_{q=1}^{4} g_{r=1} \circ g_{r=2}^{q-1},$$

where q represents a q-th branch, that is, the number of dilated convolution executions, $g_{r=2}^{q-1}$ represents dilated convolution with an expansion coefficient of 2, and $g_{r=1}$ represents general convolution with an expansion coefficient of 1. The multi-scale enhancement output result multi_F is input into a fully connected layer, classification results of pixels in each ROI are output using a softmax activation function, and the limb mask is drawn using a same color for pixels of a same category.

Step 5 (reference no. 150): The fish limb mask 340 generated in step 4 (reference no. 140) is usually accompanied by multi-fish interference and optical interference. Some noisy connected areas contain pixel features of the target, so it is necessary to remap the target pixel to remove noise, so as to obtain a smooth limb mask. A specific process 160 is as follows: inputting classification label information of the fish limb mask generated in step 4 (reference no. 140), obtaining bounding boxes of each mask, traversing image pixels, adding a classification label for each pixel, calculating a number of pixels in each connected area, and retaining a unique maximum connected area of a same category.

The above embodiments are preferred implementations of the present disclosure, but the present disclosure is not limited to the above implementations. Any obvious improvement, substitution, or modification made by those skilled in the art without departing from the essence of the present disclosure should fall within the protection scope of the present disclosure.

What is claimed is:

1. A juvenile fish limb identification method based on a multi-scale cascaded perceptual convolutional neural network, comprising the following steps:

step 1: acquiring a video sequence of a juvenile fish, obtaining an original image, identifying and separating each individual fish in the original image, deleting incomplete individual fishes, and normalizing a size of the original image;

step 2: dividing a fish body in the original image into multiple non-overlapping parts, performing semantic annotation on each of the multiple non-overlapping parts, and taking the multiple non-overlapping parts as an input of the multi-scale cascaded perceptual convolutional neural network;

step 3: performing image feature extraction, candidate region generation, and fish limb mask generation on an input image using the multi-scale cascaded perceptual convolutional neural network in sequence;

during the image feature extraction, extracting features of the input image through a convolutional layer, a maximum pooling layer and four convolutional structures, and outputting a global feature map;

performing the candidate region generation based on an Attention-region proposal network (RPN), taking a feature map output by a convolutional structure during the image feature extraction as a shared feature layer of the Attention-RPN and fusing the feature map into a 1,024-dimensional feature map, convolving the input feature map through sliding windows, mapping, by each of the sliding windows, the feature map to a lower dimension for binary classification to determine whether an input feature is a background or a fish body, and regressing frame coordinates; and generating multiple anchor boxes with different sizes and proportions and corresponding annotations with each pixel as a center, wherein each of the anchor boxes is represented by 256 dimensional features corresponding to a center pixel of the anchor box, and gradient descent and error backpropagation algorithms are adopted during training; and during the fish limb mask generation, processing an output after fusion with all windows using a convolutional kernel of 3*3, fusing with the global feature map to form a region of interest (ROI), up-sampling pixels of the ROI to obtain a more precise representation, processing features of different sizes with a multi-scale input, determining a category of corresponding pixels and regressing pixel coordinates to generate a fish limb mask; and step 4: remapping a target pixel of the fish limb mask generated in step 3 to remove noise, so as to obtain a smooth fish limb mask.

2. The juvenile fish limb identification method based on a multi-scale cascaded perceptual convolutional neural network according to claim 1, wherein in step 3, a structure layout of the convolutional layer used in the image feature extraction is as follows:

a first layer is the convolutional layer for the image feature extraction, and a convolutional kernel has a size of 7*7, a stride of 2, and a number of channels of 64; and a second layer is the maximum pooling layer for dimension reduction, and the pooling layer has a size of 3*3 and a stride of 2; and third to eleventh layers are a convolutional structure conv2_X, comprising 3 groups of convolutional structures with a convolutional kernel having a size of 1*1 and a number of channels of 64, a convolutional kernel having a size of 3*3 and a number of channels of 64, and a convolutional kernel having a size of 1*1 and a number of channels of 256; twelfth to twenty-third layers are a convolutional structure conv3_X, comprising 4 groups of convolutional structures with a convolutional kernel having a size of 1*1 and a number of channels of 128, a convolutional kernel having a size of 3*3 and a number of channels of 128, and a convolutional kernel having a size of 1*1 and a number of channels of 512; twenty-fourth to ninety-fourth layers are a convolutional structure conv4_X, comprising 23 groups of convolutional structures with a convolutional kernel having a size of 1*1 and a number of channels of 256, a convolutional kernel having a size of 3*3 and a number of channels of 256, and a convolutional kernel having a size of 1*1 and a number of channels of 1,024; and ninety-third to one hundred and first layers are a convolutional structure conv5_X, comprising 3 groups of convolutional structures with a convolutional kernel having a size of 1*1 and a number of channels of 512, a convolutional kernel having a size of 3*3 and a number of channels of 512, and a convolutional kernel having a size of 1*1 and a number of channels of 2,048.

3. The juvenile fish limb identification method based on a multi-scale cascaded perceptual convolutional neural network according to claim 1, wherein in step 3, a specific process of the candidate region generation based on the Attention-RPN is as follows:

initializing a connection weight, a threshold and a learning rate, setting an activation function, calculating an output of a hidden layer and an output of the network, calculating a network error, and calculating a partial derivative of the network error to a connection weight of an output layer and a connection weight of the hidden layer; updating network parameters; calculating a global error of the network, determining whether the global error of the network meets a set required value, if yes, determining network convergence, and if not, returning for a next iteration; calculating an intersection over union (IOU) through a true value manually marked in step 2, selecting positive and negative sample sets for training, retaining pixels with an IOU>0.7, and discarding pixels with an IOU<0.3; and calculating similarity between an eigenvalue generated by the Attention-RPN and a label by a depth-by-depth method, and selectively retaining anchor boxes with high similarity to generate candidate regions through the similarity.

4. The juvenile fish limb identification method based on a multi-scale cascaded perceptual convolutional neural network according to claim 3, wherein a formula for calculating the output $H_j$ of the hidden layer is:

$$H_j = f\left(\sum_i^n \omega_{ij} x_i - a_i\right), j = 1, \ldots, l,$$

wherein $\omega_{ij}$ is the connection weight of the hidden layer, $x_i$ is a i-th input of the Attention-RPN, i=1, . . . , n, $a_i$ is a threshold of the hidden layer, $H_j$ is an output of a j-th hidden layer, and l is a total number of the hidden layers;

a formula for calculating an output $y_k$ of the Attention-RPN is:

$$y_k = \sum_{j=1}^{l} H_j \omega_{jk} - b_k, k = 1, \ldots, m,$$

wherein $\omega_{jk}$ is the connection weight of the output layer, $b_k$ is a threshold of the output layer, k is a serial number of the output layer, and m is a total number of the output layers; and the network error is: $e_k = y_k - d_k$, wherein $e_k$ is the network error and $d_k$ is a k-th expected output.

5. The juvenile fish limb identification method based on a multi-scale cascaded perceptual convolutional neural network according to claim 3, wherein formulas for updating the network parameters are:

$$\omega_{jk}^{n+1} = \omega_{jk}^n - \eta \frac{\partial e}{\omega_{jk}} \text{ and } \omega_{ij}^{n+1} = \omega_{ij}^n - \eta \frac{\partial e}{\omega_{ij}},$$

respectively, wherein $\eta$ is a momentum factor, both $$\frac{\partial e}{\omega_{jk}} \text{ and } \frac{\partial e}{\omega_{ij}}$$

represent a partial derivative of the network error to the weight, $\omega_{jk}^n$ is a connection weight of an n-th output layer, $\omega_{jk}^{n+1}$ is a connection weight of an updated (n+1)-th output layer, $\omega_{ij}^n$ is a weight of an n-th hidden layer, and $\omega_{ij}^{n+1}$ is a connection weight of an updated (n+1)-th hidden layer.

6. The juvenile fish limb identification method based on a multi-scale cascaded perceptual convolutional neural network according to claim 3, wherein a formula for calculating the global error of the network E is:

$$E = \frac{1}{m} \sum_{k=1}^{m} (d_k - y_k)^2,$$

wherein k is a serial number of the output layer, m is a total number of the output layers, $d_k$ is a k-th expected output, and $y_k$ is an output of the Attention-RPN; and a loss function is:

$$L(\{P_{arc}\}, \{t_{arc}\}) = \frac{1}{N_{cls}} \sum_{i} L_{cls}(P_{arc}, p_{arc}^*) + \lambda \frac{1}{N_{reg}} \sum_{arc} p_{arc}^* L_{reg}(t_{arc}, t_{arc}^*),$$

wherein $N_{cls}$ represents a number of categories; $L_{cls}$ represents logarithmic loss of binary classification; arc represents all anchor boxes for each batch; $P_{arc}$ represents a probability that the anchor box belongs to a positive anchor box, when the anchor box is the positive anchor box, $P^*_{arc}$ is 1, otherwise, $P^*_{arc}$ is 0; $N_{reg}$ represents a number of regressions of anchor boxes; $\lambda$ represents a penalty coefficient of a regression function for weight distribution in calculation of regression loss and classification loss during network training; $L_{reg}$ represents regression loss of the anchor box; $t_{arc}$ represents parameterized coordinates of a predictive box; $t^*_{arc}$ represents parameterized coordinates of a target box; and outputs of a classification layer and a regression layer are respectively $\{P_{arc}\}$ and $\{t_{arc}\}$ normalized by $N_{cls}$, $N_{reg}$ and $\lambda$.

7. The juvenile fish limb identification method based on a multi-scale cascaded perceptual convolutional neural network according to claim 6, wherein the parameterized coordinates are fine-tuned by regression through the following formulas:

$$t_x=(x-x_a)/w_a, t^*_x=(x^*-x_a)/w_a,$$

$$t_y=(y-y_a)/h_a, t^*_y=(y^*-y_a)/h_a,$$

$$t_w=\log(w/w_a), t^*_w=\log(w^*/w_a), \text{ and}$$

$$t_h=\log(h/h_a), t^*_h=\log(h^*/h_a),$$

wherein x and y represent central coordinates of the predictive box; w and h represent a width and height of the predictive box respectively; $x_a$ and $y_a$ represent central coordinates of the generated anchor box; $w_a$ and $h_a$ represent a width and height of the generated anchor box respectively; x* and y* represent central coordinates of the target box; and w* and h* represent a width and height of the target box respectively; and $t_{arc}=[t_x,t_y,t_w,t_h]$ and $t^*_{arc}=[t_x,t_y,t_w,t_h]$.

8. The juvenile fish limb identification method based on a multi-scale cascaded perceptual convolutional neural network according to claim 3, wherein the similarity is defined as:

$$G_{h,w,c} = \sum_{i,j} X_{i,j,c} Y_{h+i-1,w+j-1,c}, i, j \in \{1, \ldots, S\},$$

wherein $G_{h,w,c}$ represents a feature map having a window size of h*w and a number of channels of c generated by the Attention-RPN; $X_{i,j,c}$ represents features of a label image 321 in the window calculated by the depth-by-depth method; $Y_{h+i-1,w+j-1,c}$ represents a feature map of the label image 322; S represents a maximum value selected by the sliding window; and j represents a serial number of the hidden layer, and i represents an input of the Attention-RPN.

9. The juvenile fish limb identification method based on a multi-scale cascaded perceptual convolutional neural network according to claim 1, wherein in step 3, a specific process of the fish limb mask generation is as follows:

extracting features of images of small-size limbs by general convolution, and extracting features of images of large-size limbs by dilated convolution, wherein dilated convolution is $g_r$=ROI*, count, *$_r$ represents a dilated convolution operation, r represents an expansion coefficient, in the general convolution, r=1, in the dilated convolution, r=n,n>1, and count represents a number of dilated convolution executions; defining an iterative function on a set X as: assuming X to be a set and $f^p$: X→X to be a function, wherein f represents a mapping operation of X, a superscript represents a specific number of iterations, $f^0$=idx, $f^{p+1}$=f∘$f^p$, p is a non-negative integer, idx is an identity function on X, f∘$f^p$ represents a compound operation of the two functions, a compound result is represented by f(g(x)), and a final multi-scale enhancement output result is $$\text{multi\_F} = \prod_{q=1}^{4} g_{r=1} \circ g_{r=2}^{q-1},$$

wherein q represents a q-th branch, that is, the number of dilated convolution wherein executions, $g^{q-1}_{r=2}$ represents dilated convolution with an expansion coefficient of 2, and $g_{r=1}$ represents general convolution with an expansion coefficient of 1; and inputting the multi-scale enhancement output result multi_F into a fully connected layer, outputting classification results of pixels in each ROI using a softmax activation function, and drawing the limb mask using a same color for pixels of a same category.

10. The juvenile fish limb identification method based on a multi-scale cascaded perceptual convolutional neural network according to claim 1, wherein a specific process of step 4 is as follows: inputting classification label information of the fish limb mask generated in step 3, obtaining bounding boxes of each mask, traversing image pixels, adding a classification label for each pixel, calculating a number of pixels in each connected area, and retaining a unique maximum connected area of a same category.

* * * * *